United States Patent
Kobayashi

(10) Patent No.: US 6,556,535 B1
(45) Date of Patent: Apr. 29, 2003

(54) OPTICAL RECORDING/REPRODUCING APPARATUS

(75) Inventor: Hajime Kobayashi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/520,510

(22) Filed: Mar. 8, 2000

(30) Foreign Application Priority Data

Mar. 10, 1999 (JP) .......................................... 11-062479

(51) Int. Cl.⁷ ................................................ G11B 7/00
(52) U.S. Cl. .................................... 369/116; 369/59.11
(58) Field of Search .............................. 369/116, 59.11, 369/47.5, 47.52, 53.26, 53.27, 13.24, 13.25, 13.26, 13.28; 372/28–31

(56) References Cited

U.S. PATENT DOCUMENTS

| | | | |
|---|---|---|---|
| 4,685,097 A | * | 8/1987 | van der Put ................. 369/116 |
| 4,796,250 A | * | 1/1989 | Kobayashi et al. .......... 369/116 |
| 5,040,163 A | * | 8/1991 | Sasaki et al. ................ 369/116 |
| 5,477,557 A | | 12/1995 | Inaba et al. |
| 5,495,463 A | | 2/1996 | Akagi et al. |
| 5,712,839 A | | 1/1998 | Aoki |
| 5,745,463 A | | 4/1998 | Aoki et al. |
| 5,768,245 A | | 6/1998 | Maeda et al. |
| 5,798,992 A | * | 8/1998 | Kaneko et al. .............. 369/116 |
| 6,246,659 B1 | * | 6/2001 | Suzuki et al. ................ 369/116 |

FOREIGN PATENT DOCUMENTS

| | | | |
|---|---|---|---|
| JP | 04157632 A | * | 5/1992 |
| JP | 4362525 | | 12/1992 |
| JP | 628676 | | 2/1994 |
| JP | 7262560 | | 10/1995 |
| JP | 10134352 | | 5/1998 |

* cited by examiner

*Primary Examiner*—Thang V. Tran
(74) *Attorney, Agent, or Firm*—Dickstein, Shapiro, Morin & Oshinsky, LLP

(57) ABSTRACT

An optical recording/reproducing apparatus includes a monitor sensor for sensing the amount of emission from a laser diode or optical head. The output of the monitor sensor is routed through a non-inverting wide-band amplifier and an inverting amplifier to an envelope detector. The envelope detector detects peak values out of the input signal and delivers them to a current amplifier via an amplifier and a comparator. The current amplifier feeds a current corresponding to the input to the laser diode. This current corresponds to erasing power. The apparatus senses the emission conditions of the laser diode between the start and end of the recording operation so as to cause erasing power to constantly coincide with a reference value.

9 Claims, 4 Drawing Sheets

OPTICAL RECORDING/REPRODUCING APPARATUS

BACKGROUND OF THE INVENTION

The present invention relates to an optical recording/reproducing apparatus and more particularly to an optical recording/reproducing apparatus for recording and reproducing data out of an overwritable optical recording/reproducing medium, e.g., a phase change optical medium.

The prerequisite for an overwritable optical recording/reproducing medium, particularly a phase change optical medium, is that in the event of overwriting, an optical head outputs both the erasing power and the recording power in a stable manner. Accordingly, when erasing power and/or recording power differ from optimal power, record marks formed on the recording film of the medium deteriorates and thereby increasing a record/reproduction error rate.

A conventional optical recording/reproducing apparatus includes a mechanism to maintain the mean output of an optical head constant. This function corresponds to maintaining recording power to be constant at the time of overwriting. As for erasing power, while the minimum value in the binary modulation condition of an optical head must be constantly maintained, it has been customary to fix a current that sets the mimimum value.

A conventional optical recording/reproducing apparatus will be described with reference to FIG. 4. As shown, the apparatus includes a monitor sensor 110, an amplifier 120, a comparator 130, current amplifiers 140 and 170 each for setting an amount of laser diode emission, a reference recording power value generator 150, a reference erasing power value generator 160, and a laser diode 180 playing the role of an optical head.

In operation, the monitor sensor 110 senses the amount of emission from the laser diode or optical head 180 during recording. The output signal of the monitor sensor 110 is input to the amplifier 120 and amplified to a DC level necessary for control thereby. An amplified signal output from the amplifier 120 is then fed to one input of the comparator 130. A reference recording power value output from the reference recording power value generator 150 is applied to the other input of the comparator 130. The comparator 130 compares the amplified signal and the reference recording power value and delivers the result of the comparison to the current amplifier 140. Binary record data are also input to the current amplifier 140. A current set by the current amplifier 140 is output when the record data is, e.g., (logical) ONE "1", but it is not output when the record data is (logical) ZERO "0". The current set by the current amplifier 140 is next fed to the laser diode 180.

Also, the reference erasing power value generator 160 feeds a constant current to the current amplifier 170. A current set by the current amplifier 170 is also input to the laser diode 180. In this manner, recording power and erasing power necessary for overwriting are delivered to the laser diode or optical head 180.

As stated above, the conventional apparatus senses the means output of the laser diode 180, compares it with a reference value, and sets a laser diode current or recording power such that the mean output coincides with the reference value. This is adequate to maintain the recording power constant even when temperatures around the apparatus varies. On the other hand, to set erasing power, a constant current is input to the laser diode 180. However, as shown in FIG. 5, the current-to-emission characteristic of the laser diode 180 is such that while a constant current is fed, the elevation of the ambient temperature causes the emission of the laser diode to decrease. Specifically, FIG. 5 indicates that as the ambient temperature rises from 0 C. to 25 C. and further to 50 C. while a constant current is fed, the emission of the laser diode sequentially decreases. Consequently, when the ambient temperature varies, adequate erasing power cannot be set and results in the deterioration of the record/reproduction error rate.

Japanese Patent Laid-Open Publication No. 6-28676, for example, discloses circuitry for controlling not only recording power but also erasing power. The circuitry includes a pin photodiode for sensing the output of a semiconductor laser and sets erasing power and recording power on the basis of the output of the pin photodiode. A sample-and-hold circuit holds the set erasing power and recording power and continuously applies them to the semiconductor laser until the end of the recording and erasing operation. With this configuration, the circuitry may output adequate erasing power just after the start of a recording operation. However, the circuitry does not guarantee that the erasing power remains adequate despite the variation of ambient temperature that may occur after the start of recording.

Japanese Patent Laid-Open Publication Nos. 4-362525, 7-262560 and 10-134352 also teach technologies of the kind described. None of them, however, teaches a method for maintaining adequate erasing power against the varying ambient temperature.

SUMMARY OF THE INVENTION

It is therefore an object of the present invention to provide an optical recording/reproducing apparatus capable of maintaining adequate recording power as well as adequate erasing power necessary for recording even when the ambient temperature varies.

An optical recording/reproducing apparatus of the present invention includes a mean value detecting device for detecting a mean value in the binary modulation condition of the output of an optical head, a minimum value detecting device for detecting a minimum value in the binary modulation condition of the output of the optical head, and an input current setting device for setting a current to be input to the optical head in accordance with the above mean value and minimum value.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
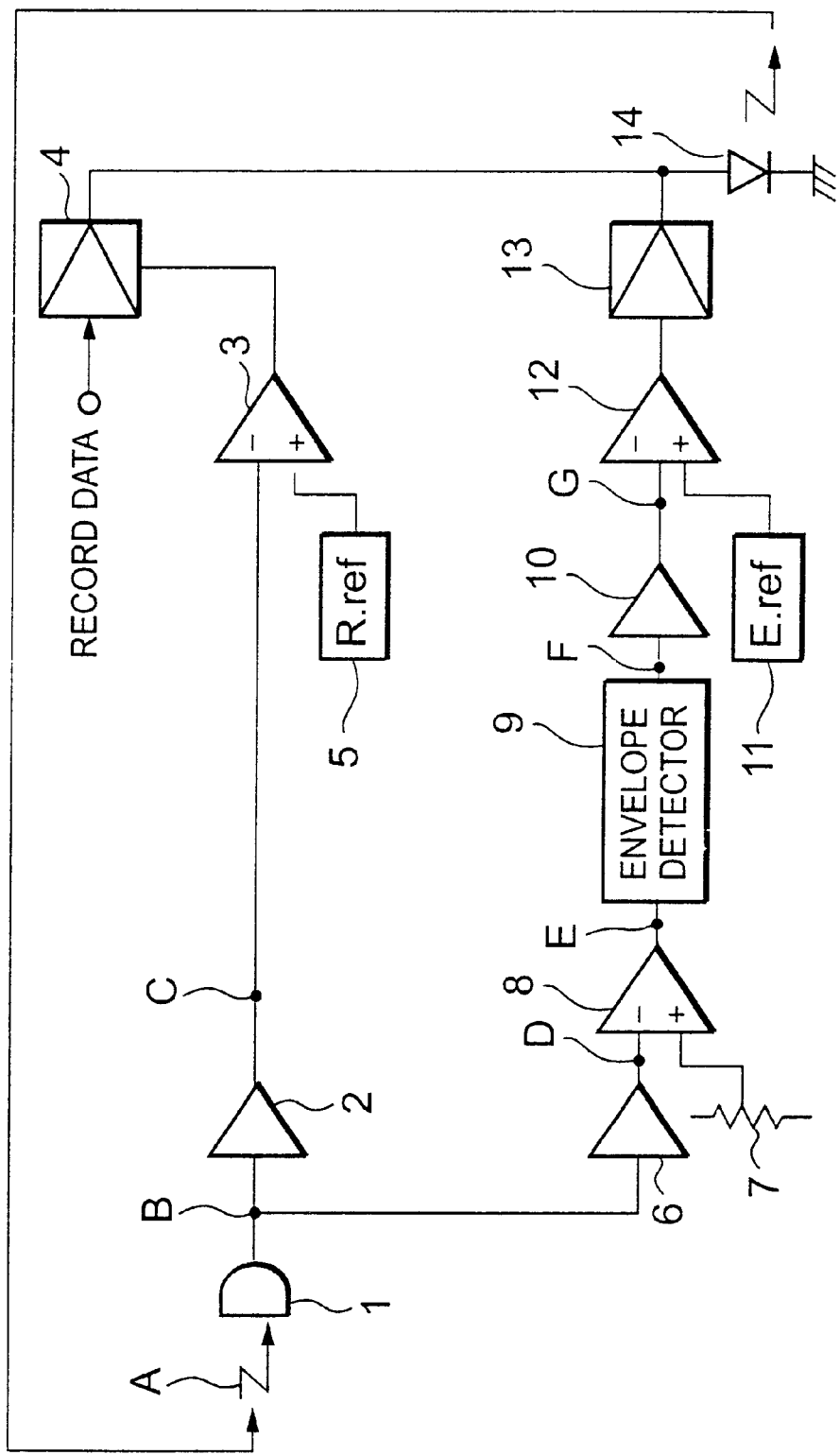
FIG. 1 is a block diagram illustrate an optical recording/reproducing apparatus embodying the present invention.

Referring to FIG. 1, an optical recording/reproducing apparatus embodying the present invention is shown. As shown, the apparatus includes a monitor sensor 1, a narrowband amplifier 2, a comparator 3, a current amplifier 4 for setting an amount of laser diode emission, a reference recording power value generator 5, a non-inverting wide-band amplifier 6, a signal generator 7 for DC offset adjustment, an inverting amplifier 8 with a DC offset adjuster, an envelope detector 9, an amplifier 10, a reference erasing power value generator 11, a comparator 12, a current amplifier for setting an amount of laser diode emission, and a laser diode or optical head 14.

During recording, the monitor sensor 1 senses the amount of emission of the laser diode 14. The resulting output of the monitor sensor 1 is input to the narrow-band amplifier 2 and amplified to a DC level necessary for recording power control thereby. An amplified signal output from the narrow-band amplifier 2 is applied to the inverting input of the comparator 3. A reference recording power value output from the reference recording power generator 3. The comparator 3 compares the amplified signal and reference recording power value and delivers the result of comparison to the current amplifier 4. Binary record data are also input to the current amplifier 4. A current set by the current amplifier 4 is output when the record data is "1", but it is not output when the record data is "0".

Regarding the erasing operation, overwriting operation is effected during recording. Specifically, the monitor sensor 1 senses the amount of optical head emission during recording. The resulting output of the monitor sensor 1 is input to the non-inverting wide-band amplifier 6. An amplified signal output from the amplifier 6 is delivered to the inverting input of the inverting amplifier 8 including the DC offset adjuster. A DC signal output from the signal generator 7 for DC offset adjustment is input to the non-inverting input of the inverting amplifier 8. The resulting output of the inverting amplifier 8 is fed to the envelope detector 9. The envelope detector 9 detects the envelope of the input signal and delivers its output to the amplifier 10. The amplifier 10 amplifies the output of the envelope detector 9 to a DC level necessary for erasing power control. The signal amplified by the amplifier 10 corresponds to sensed erasing power value. The output of the amplifier 10 is input to the inverting input of the comparator 12. A reference erasing power value output from the reference erasing power value generator 11 is fed to the non-inverting input of the comparator 12. The comparator 12 compares the output of the amplifier 10 and the reference erasing power value and delivers the result of comparison to the current amplifier 13 which sets an amount of laser diode emission. The signal previously input to the current amplifier 13 and the previous signal input to the current amplifier 4 are amplified by the respective amplifier and then fed to the laser diode 14 as a set current. In this manner, recording power and erasing power necessary for overwriting are input to the optical head.

Figure 2:
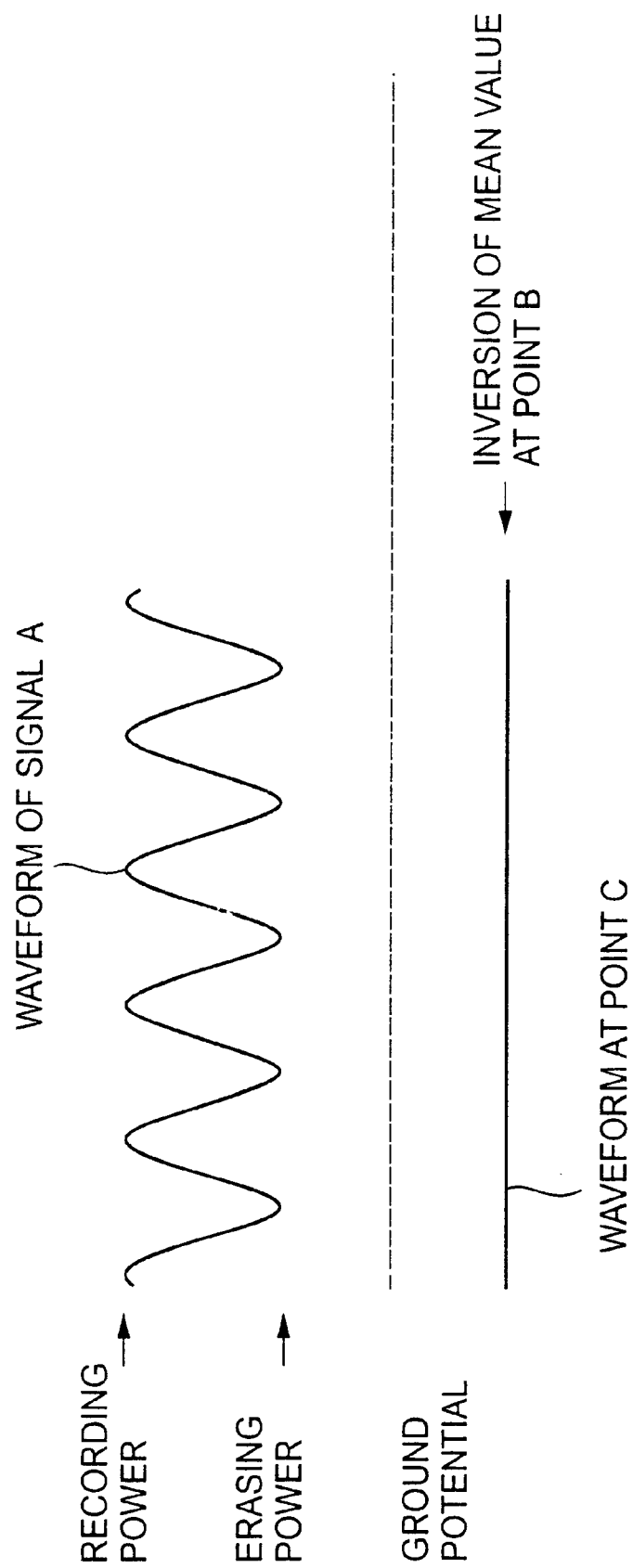
FIGS. 2 and 3 each show the waveforms of particular signals appearing in the illustrative embodiment.
Figure 3:
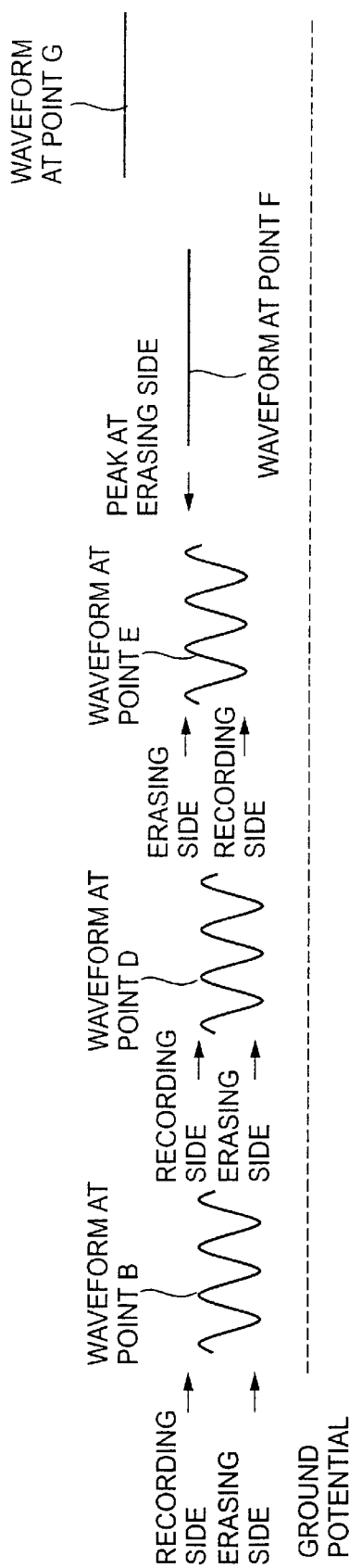
Figure 4:
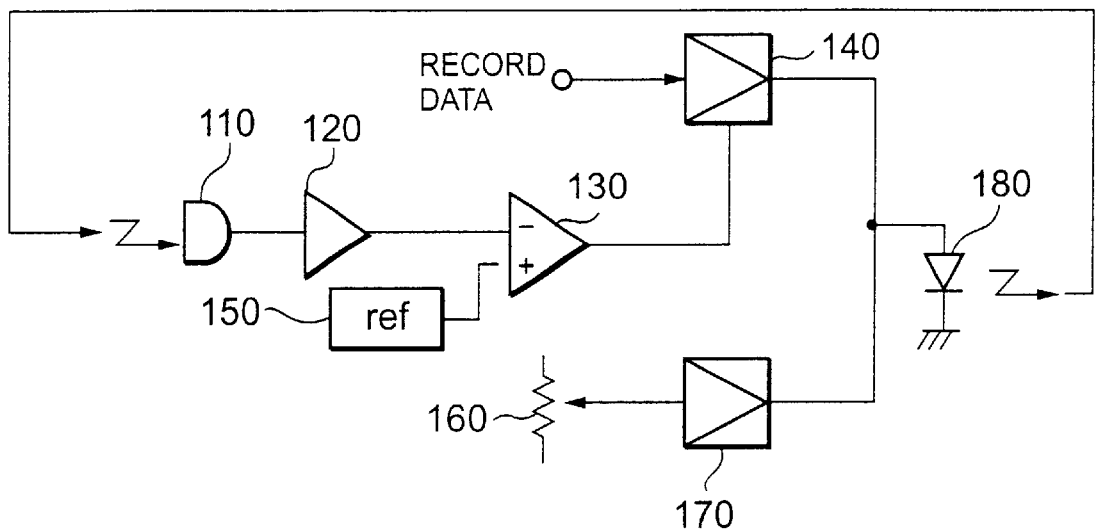
FIG. 4 is a block diagram schematically illustrating a conventional optical recording/reproducing apparatus.
Figure 5:
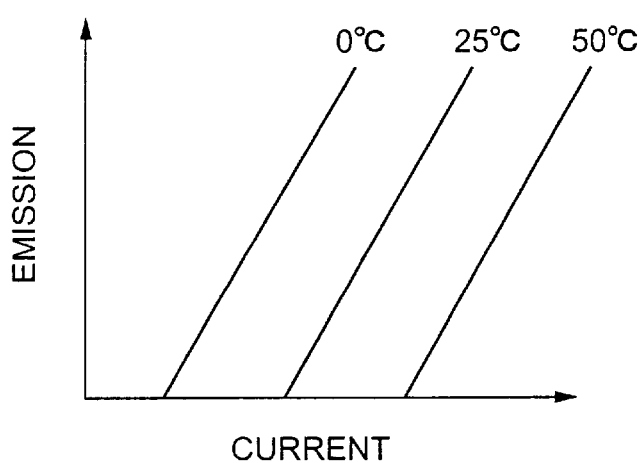
FIG. 5 is a graph illustrating the current-to-emission characteristic of a laser diode.

FIG. 2 shows the waveform of a signal A shown in FIG. 1 which is the signal input to the monitor sensor 1, i.e., the signal output from the laser diode 14, and the waveform of the output of the narrow-band amplifier 2 appearing at a point C also shown in FIG. 1. FIG. 3 shows the waveform of the output of the monitor sensor 1 appearing at a point B, the waveform of the output of the non-inverting wide-band amplifier 6 appearing at a point D, the waveform of the output of the inverting amplifier 8 appearing at a point E, the waveform of the output of the envelope detector 9 appearing at a point F, and the waveform of the output of the amplifier 10 appearing at a point G.

In the illustrative embodiment, recording power control is executed with the mean value of the emission conditions. Therefore, the recording power output is input to and amplified by the narrow-band amplifier 2. On the other hand, erasing power control is executed with the peak values of the emission conditions. To detect peak values, the erasing power is input to and amplified by the non-inverting wide-band amplifier 6. The envelope detector 9 detects the envelope of the output of the wide-band amplifier while maintaining its waveform.

As shown in FIG. 2, the signal A has a sinusoidal waveform of positive potentials. The maximum value and minimum value of this waveform are respectively representative of the peak of the recording power and the peak of the erasing power. On the other hand, the waveform at the point C is representative of a DC signal having a negative potential. That is, the DC signal appearing at the point C is the mean value of the outputs of the monitor sensor 1 amplified and inverted by the narrow-band amplifier 2.

As shown in FIG. 3, the waveform at point B is sinusoidal and has positive potentials like signal A. the waveform at point D is substantially identical with the waveform at point B. However, the waveform at point D differs in amplitude from the waveform at point B because it is output from the non-inverting wide-band amplifier 6 that amplifies the signal appearing at point B. The waveform at point E is the inverted form of the waveform at point D. Therefore, the maximum value and minimum value of the waveform at point E are respectively representative of the peak value of the erasing power and the peak value of the recording power. Further, the waveform at point E has a value corresponding to the output of the signal generator 7 including the AD offset adjuster. The waveform at point F is representative of DC having a positive potential. This is because the envelope detector 9 detects the envelope of the waveform at point E and thereby causes the peak values at the erasure side to appear in the form of a continuous signal. The waveform at point G is output from the amplifier 10 which DC amplifies the waveform at point G.

As stated above, the illustrative embodiment senses the emission conditions of the laser diode 14 throughout the interval between the start of a recording operation and the interval between the start of a recording operation and the end of the same so as to cause each of the recording power and the erasing power to constantly coincide with a particular reference value. It is therefore possible to maintain the output of the laser diode or optical head 14 at a value necessary for recording.

In summary, an optical recording/reproducing apparatus includes mean value detecting means for detecting a mean value in the binary modulation condition of the output of an optical head, minimum value detecting means for detecting a minimum value in the binary modulation condition of the output of the optical head, and input current setting means for setting a current to be input to the optical head in accordance with the above mean value and minimum value. The apparatus is therefore capable of maintaining a recording power and erasing power at respective adequate values necessary for recording even when temperature varies. This allows a recording/reproducing error rate to be maintained.

Various modifications will become possible for those skilled in the art after receiving the teachings of the present disclosure without departing from the scope thereof.

What is claimed is:

1. An optical recording/reproducing apparatus comprising:

mean value detecting means for detecting a mean value in a binary modulation condition of an output of an optical head;

minimum value detecting means for detecting a minimum value in the binary modulation condition; and input current setting means for setting a current to be input to said optical head in accordance with the mean value and the minimum value, wherein said minimum value detecting means comprises:
a non-inverting wide-band amplifier for amplifying the output of said optical head;
an inverting amplifier for inverting an output of said non-inverting wide-band amplifier; and
an envelope detector for detecting an envelope of an output of said inverting amplifier.

2. An apparatus as claimed in claim 1, wherein said input current setting means sets recording power of said optical head on the basis of the mean value.

3. An apparatus as claimed in claim 1, said input current setting means sets erasing power of said optical head on the basis of the minimum value.

4. An apparatus as claimed in claim 1, wherein said mean value detecting means comprises a narrow-band amplifier for amplifying the output of said optical head.

5. An apparatus as claimed in claim 1, wherein said input current setting means comprises a comparator for comparing the mean value and a preselected recording power value and sets a recording power in accordance with an output from said comparator.

6. An apparatus as claimed in claim 1, wherein said input current setting means comprises a comparator for comparing the minimum value and a preselected reference erasing power value and sets an erasing power in accordance with an output from said comparator.

7. An apparatus as claimed in claim 1, wherein said apparatus records and reproduces data from an overwrittable optical recording/reproducing medium.

8. An optical recording/reproducing apparatus comprising:

mean value detecting means for detecting a mean value in a binary modulation condition of an output of an optical head;

minimum value detecting means for detecting a minimum value in the binary modulation condition of the output of said optical head; and input current setting means for setting a current to be input to said optical head in accordance with the mean value and the minimum value, wherein said minimum value detecting means comprises:
a wide-band amplifier for amplifying an output of said optical head; and
an envelope detector receiving an output of said wide-band amplifier for detecting an envelope of a signal portion corresponding to the minimum value.

9. An optical recording/reproducing apparatus comprising:

a mean value detector, said mean value detector detecting a mean value in a binary modulation condition of an output of an optical head;

a minimum value detector, said minimum value detector detecting a minimum value in the binary modulation condition; and an input current setter, said setter setting a current to be input to said optical head in accordance with the mean value and the minimum value, wherein said minimum value detector comprises:
a non-inverting wide-band amplifier for amplifying the output of said optical head;
an inverting amplifier for inverting an output of said non-inverting wide-band amplifier; and
an envelope detector for detecting an envelope of an output of said inverting amplifier.

* * * * *